United States Patent [19]
Oka et al.

[11] 3,884,499
[45] May 20, 1975

[54] DISCHARGE VALVE FOR VEHICLE SAFETY APPARATUS

[75] Inventors: Takashi Oka, Tokyo; Kazuma Sato, Yokosuka, both of Japan

[73] Assignee: Nissan Motor Company Limited, Yokohama, Japan

[22] Filed: Oct. 16, 1973

[21] Appl. No.: 406,841

[30] Foreign Application Priority Data
Oct. 18, 1972 Japan.............................. 47-104259

[52] U.S. Cl.............................. 280/150 AB; 137/68
[51] Int. Cl............................................ B60r 21/08
[58] Field of Search................ 280/150 AB; 89/1 B; 102/38; 222/5; 137/68

[56] References Cited
UNITED STATES PATENTS

| | | | |
|---|---|---|---|
| 3,101,733 | 8/1963 | Lord | 222/5 X |
| 3,125,108 | 3/1964 | Murphy | 89/1 B X |
| 3,741,583 | 6/1973 | Usui et al. | 280/150 AB |
| 3,747,953 | 7/1973 | Goes et al. | 280/150 AB |

FOREIGN PATENTS OR APPLICATIONS

| | | | |
|---|---|---|---|
| 896,312 | 11/1953 | Germany | 280/150 AB |

*Primary Examiner*—Kenneth H. Betts

[57] ABSTRACT

A brittle plate seals a hole in a confinement inflatable in response to a vehicle collision. An explosive propels a projectile against the plate to shatter it and allow excess fluid to escape through the hole as an occupant strikes the confinement.

4 Claims, 3 Drawing Figures

DISCHARGE VALVE FOR VEHICLE SAFETY APPARATUS

This invention is concerned with a safety apparatus for a high speed vehicle having an inflatable confinement.

A safety apparatus of the above mentioned type generally comprises a flexible bag or confinement which is normally stored in a collapsed, inoperative state and is inflatable to a protective position, and a fluid producer to produce pressurized fluid to inflate the confinement. Actuation of the fluid producer is performed in response to a collision condition of the vehicle by an appropriate sensor such as an inertia responsive switch. The inflated bag or confinement is able to restrain abrupt forward movement of an occupant to prevent him from colliding with a solid portion of the vehicle such as the instrument panel and/or windshield.

In this type of safety apparatus, the fluid pressure in the bag is extremely high at the instant when the occupant hits the bag. After the occupant's forward movement has been stopped, a confinement under such high pressure will sharply bounce the occupant in the opposite direction. Such a movement of the occupant is called "rebound," and may cause him injury as serious as a collision with a vehicle dashboard, etc.

In order to avoid this contingency, a known safety apparatus is provided with discharge means in the form of a hole in the bag surface, through which fluid is discharged from the bag to dissipate rebound energy. However, through such a constantly open hole, fluid discharge from the bag begins at the initial moment of bag inflation and continues until the bag is completely deflated. A discharge means of this type is therefore impractical in that it discharges too much fluid to allow complete inflation of the bag.

There is known a better discharge means in the form of a pressure relief valve provided through the bag surface, which is arranged to open at a predetermined fluid pressure within the bag. A rupturable patch or a weakened portion of the bag cloth are examples. The strength of the patch or weakened portion is usually so designed that the means is broken due to the high pressure produced when the occupant strikes the inflated bag. However, the means may rupture due to a relatively high pressure at the beginning of inflation of the bag, the result being the same as encountered with the constantly open hole described. Further, the inflatable bag is commonly stored in a folded condition behind a cover sheet or panel. This cover sheet must be bursted or shattered prior to inflation of the bag itself. As soon as the fluid producer is triggered, the fluid pressure in the bag momentarily rises to produce a force strong enough to burst the cover sheet. Accordingly, the patch or weakened portion is very liable to rupture prematurely at the instant of bursting the cover sheet.

Still another discharge means proposed is a pressure relief valve which is responsive to a predetermined heat level in the bag interior. Such a heat-responsive valve, unlike the pressure-responsive valve above, might be free from premature opening at the time of bursting the cover sheet or at the beginning of inflating the bag. However, due to its heat-responsiveness, the ambient temperature and like environmental factors will influence its operation, making dependable opening at the critical moment difficult.

It is therefore an object of the invention to provide an improved safety apparatus which is devoid of the aforementioned shortcomings encountered with known discharge means.

Another object of the invention is to provide a fluid discharge valve for a safety apparatus in which the period between starting supply of fluid into the bag and discharge of fluid out of the bag is controllable to deflate the bag at the desired time.

Still another object is to provide a fluid discharge valve for a safety apparatus which prevents undesired escape of fluid while assuring rapid and reliable discharge of fluid out of the bag when required.

A further object is to provide a fluid discharge valve for a safety apparatus which can minimize undesirable fluid loss.

These and other objects, features and advantages of the present invention will become apparent from the following description when taken in conjunction with the accompanying drawing, which illustrates a preferred embodiment of the invention, in which.

Figure 1:
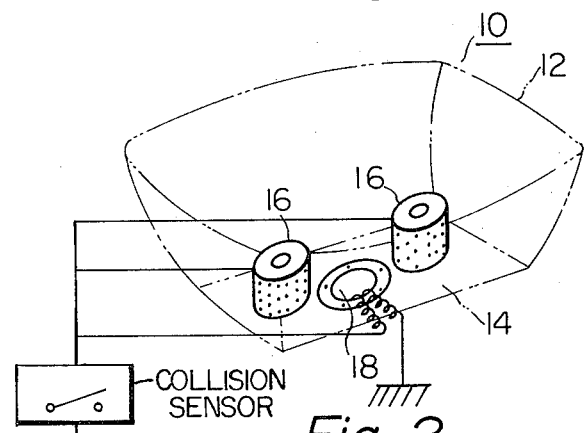
FIG. 1 is a general perspective view of a safety apparatus incorporating a discharge valve of the present invention.

In the drawing, like numerals indicate like or corresponding parts. As seen in FIG. 1, a safety apparatus 10 comprises an inflatable confinement or bag 12 shown as inflated, a portion of which is mounted by a mounting plate 14 to an appropriate member 13 of the vehicle body. In practice, the bag 12 is clamped between the member 13 of the vehicle body and the plate 14 by several bolts not numbered. The member 13 and bag 12 have holes (no numerals) formed these through as shown. On the mounting plate 14 is provided at least one fluid producer 16 (two are shown) of any known type which preferably extends into the bag interior. The fluid producer 16 is operatively connected to collision sensor (not shown) and produces pressurized fluid to inflate the bag 12 in response to a collision signal from the sensor.

Figure 2:
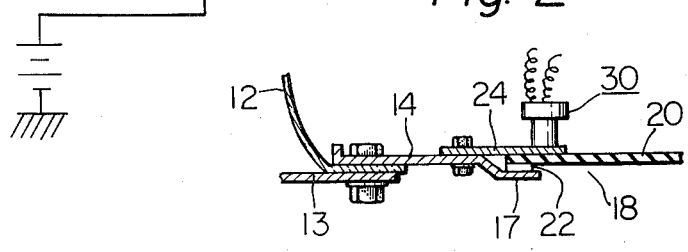
FIG. 2 is a sectional side view of the safety apparatus of FIG. 1 incorporating the discharge valve.
Figure 3:
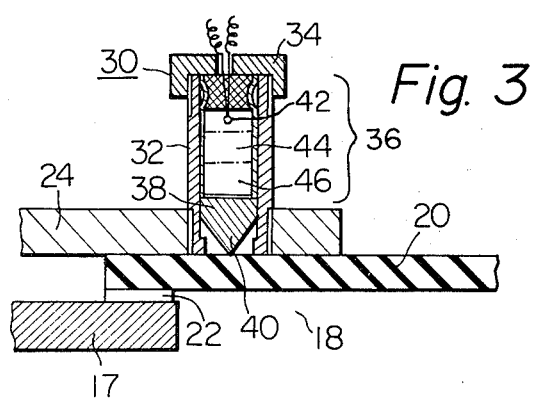
FIG. 3 is an enlarged sectional side view in detail of the discharge valve shown in FIGS. 1 and 2

As is apparent from FIGS. 1 and 2, the mounting plate 14 has a flange portion 17. A preferably circular hole 18 is formed through the flange portion 17, through which the bag 12 interior communicates externally. On the inner side of the flange portion 17 is disposed a brittle plate 20 as shown in FIGS. 2 and 3, the outer portion of which is secured by an adhesive 22 to the flange portion 17 in a fluid-tight manner to seal the hole 18. The plate 20 may be shattered by sufficient impact force, but is strong enough to resist the pressure of the fluid produced by the producer 16. Tempered glass may be most adequate for the brittle plate 30, although other materials having like properties can be used. Further, an annular support plate 24 bears against the outer portion of the plate 20 and is fastened at its outer edge to the plate 14 near the portion 17. The diameter of the hole (no numeral) of the annular support plate 24 is designed to be slightly smaller than that of the hole 18.

A plate breaker 30 is mounted on the inner edge of the support plate 24. As best seen in FIG. 3, the breaker 30 comprises a casing 32, the top of which is sealed by a cap 34 and the bottom of which is open. An explosive 36 and projectile 38 are disposed in the top and bottom respectively of the casing 32 as shown. The explosive 36 comprises three layers of different charges; a primer 42, a fuse charge 44 and a propellant 46. The primer 42 is electrically connected to the collision sensor and ignitable in response to the collision signal therefrom. The fuse charge 44 is ignitable by the primer 42 and burns for a predetermined length of time after which it ignites the propellant 46. The propellant 46, when ignited, propels the projectile 38 substantially tangentially against the brittle plate 20. A sharp tip 40 of the projectile 38 shatters the plate 20, thereby allowing fluid from the bag 12 to discharge externally therefrom through the holes in the bag and member 13 and the hole 18. Movement of the projectile is limited by a shoulder (no numeral) in the bottom of the casing 32 as shown. Also, a screen or trap may be provided below the hole 18 to prevent shattered glass from the plate 20 from being blown external of the safety apparatus, although not shown.

In operation of the safety apparatus described, the fluid producer 16 produces pressurized fluid and begins to inflate the bag 12 in response to the collision signal from the sensor indicating a collision of the vehicle. The pressure in the bag 12 might at this point rise to 1.0 to 1.5 kg/cm² (gauge), particularly if a cover sheet (not shown) must be bursted, but the brittle plate 20 of tempered glass can resist the high pressure. It is preferable to design the fluid producer 16 so that inflation of the bag 12 is completed within a period of about 20 to 40 millisec., which substantially corresponds to the experimentarily determined period from the occurrence of collision to an occupant's engagement with the bag 12.

Meanwhile, the primer 42 of the plate breaker 30 is ignited simultaneously with the actuation of the producer 16 by the collision signal from the sensor. As soon as this occurs, the adjacent fuse charge 44 is ignited and continues to burn for the predetermined length of time, which is substantially equal to the aforementioned period of about 20 to 40 millisec. for inflating the bag 12. After this period has elapsed, combustion of the fuse charge 44 is transferred to the propellant 46 for ignition thereof, whereupon hot gas under high pressure prevails in the casing 32 above the projectile 38. This pressure forcibly propels the projectile 38 out of the casing 32 so that it tip 40 contacts and shatters the plate 20. Discharge of fluid through the hole 18 and deflation of the bag 12 begin substantially at the moment when the occupant engages the inflated bag 12, whereby energy which would cause rebound is effectively dissipated.

It will be readily understood that although the breaker 30 is shown as being located adjacent to the inner surface of the bag 12, it may be provided adjacent to the outer surface thereof at a different location. According to the above description, one common collision sensor is utilized to actuate both the fluid producer and the explosive charge, but this actuation may be effected by two separate sensors.

While the invention has been shown in a form as described, it is obvious to those skilled in the art that it is not so limited, but is susceptible to various changes and modifications without departing from the scope of the invention or from the appended claims.

What is claimed is:

1. A discharge valve for a safety apparatus for a vehicle, the safety apparatus having an inflatable confinement with a hole formed therethrough, a collision sensor operative to generate a collision signal in response to a collision of the vehicle, and a fluid producer operative to produce pressurized fluid to inflate the confinement in response to the collision signal, said discharge valve comprising:
   a brittle plate sealing the hole and being strong enough to resist the pressure of the pressurized fluid produced by the fluid producer; and,
   a plate breaker comprising a casing mounted adjacent to said brittle plate and an explosive and a projectile disposed inside said casing;
   said explosive being ignitable by the collision signal;
   said explosive and said projectile being mutually aligned within said casing substantially tangent to said brittle plate so that said explosive, when ignited, propels said projectile against said brittle plate to shatter the same and allow pressurized fluid to escape through the hole from the confinement.

2. A discharge valve as claimed in claim 1, in which said explosive comprises a primer ignitable by the collision signal, a fuse charge ignitable by said primer and operative to burn for a predetermined length of time, and a propellant ignitable by said fuse charge after said predetermined length of time and operative to propel said projectile against said brittle plate to shatter the same.

3. A discharge valve as claimed in claim 2, in which said predetermined length of time is substantially that between generation of the collision signal and engagement of a vehicle occupant with the confinement.

4. A discharge valve as claimed in claim 1, in which said brittle plate is made of tempered glass.

* * * * *